E. BOSWELL.
Corn Harvester.
No. 75,119. Patented March 3, 1868.
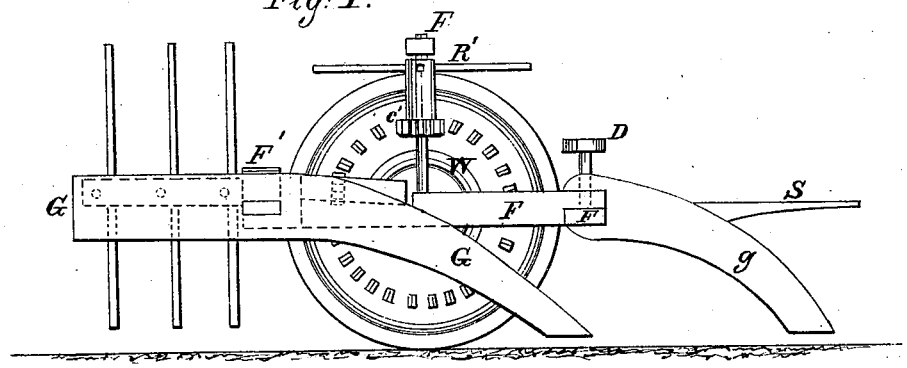
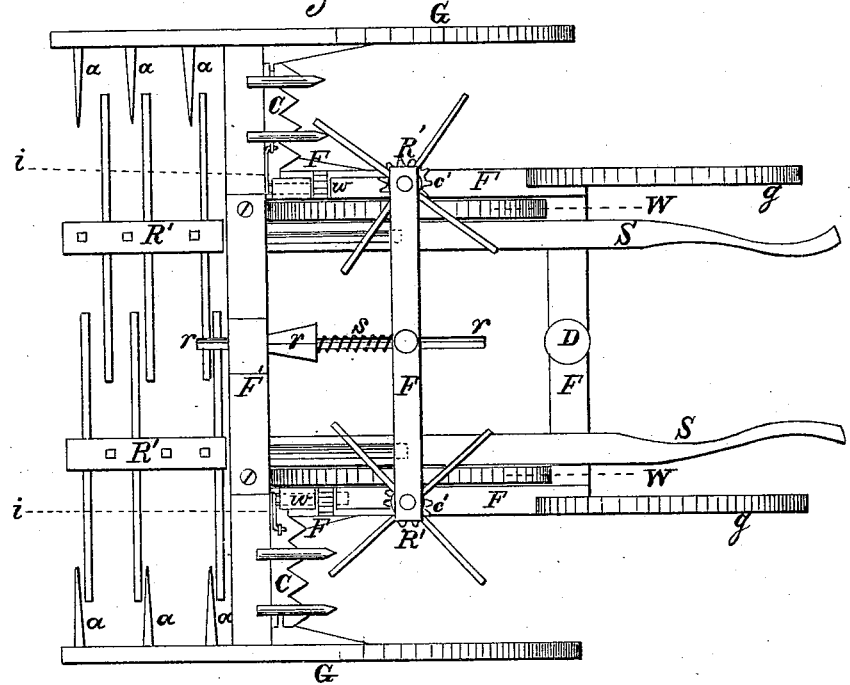
Witnesses:
Nph. Ellsworth
S. C. Kemon
Inventor,
Elihu Boswell
Per Munn & Co.
Attys

United States Patent Office.

ELIHU BOSWELL, OF HIGHLAND, OHIO.

Letters Patent No. 75,119, dated March 3, 1868.

IMPROVEMENT IN CORN-HARVESTERS.

*The Schedule referred to in these Letters Patent and making part of the same.*

TO ALL WHOM IT MAY CONCERN:

Be it known that I, ELIHU BOSWELL, of Highland, in the county of Highland, and State of Ohio, have invented a new and improved Corn-Harvester; and I do hereby declare the following to be a full, clear, and exact description of the same, reference being had to the accompanying drawings, forming part of this specification, and in which—

Figure 1 is a side elevation of my invention, and

Figure 2 represents a top view of the same.

This is an improved machine, which being driven between the rows of standing corn, gathers and cuts the corn on either side, and at the proper intervals deposits it between the rows in shocks ready for binding.

Similar letters of reference indicate corresponding parts in the several figures.

In the drawings, F F represent portions of the frame, W W the draught-wheels, D the driver's seat, and S S the shafts or thills of my improved machine. F is a stout beam, forming part of the frame, and running across the whole width of the machine behind the wheels, serving to receive and support the rear end of the shafts, and to support the cutter-bar, reels, guides, frame, and generally to connect and strengthen the various parts of the apparatus. Attached to either end of this beam is a guide-piece, G, parallel to the vertical plane of the wheels. The forward ends of the guide-pieces project to a point opposite to the driver's seat, and their rear ends extend to the rear of the cutter-bars a sufficient distance to enable the horizontal arms $a\,a$, projecting inward from them, to receive and support the corn, which after being cut off by the cutter C, falls back upon these arms. To the forward portion of the frame F, nearly opposite the front end of the outer guides G G, are attached two inner guides $g\,g$, running in the same direction as the others, but two or three feet inside of them, and reaching several feet ahead of them. Between the guides G $g$, on each side of the machine, is a space sufficiently wide to enclose a row of corn, and terminating at its rear end at the cutter-bar C, which works directly across it, cutting all the stalks that are gathered between the guides. Upright reels R R, having horizontal arms, and worked by the main wheels by means of a cog-gear, $c\,c'$, are stationed on the inner side of these spaces, and operate to bend the corn back as it reaches the cutter, insuring its fall upon the arms $a\,a$. Two other reels R' R', working in a horizontal position between the rear ends of the guides G G behind the machine, enable the driver to deposit the cut stalks in bunches or shocks. To effect this purpose, a rod, $r$, is provided, sliding backward and forward in the centre of the machine, and held in position by a spring, $s$. When in position, the rear end of this rod comes in contact with the arms of the reels R' R', and prevents their revolving. Whenever the driver wishes to deposit a shock of corn on the ground, he pulls the rod $r$ forward, liberating the horizontal reels, which immediately revolve and drop the corn. This being effected, the driver releases the rod $r$, which resumes its position by the force of the spring. The arms $a\,a$ slope downward slightly, so as to cause the corn that falls upon them to slide down and rest upon the arms of the horizontal reels. The cutters are operated in the usual manner by cranks $i\,i$, connected with small wheels or shafts $w\,w$, gearing with the cog-wheels $c\,c$ on the main wheels. The beam F is of course to be sufficiently long to extend across two rows of corn and the space between them, and the machine must be driven so that a row of corn on each side shall be intercepted between the guides G $g$.

Having thus described my invention, what I claim as new, and desire to secure by Letters Patent, is—

The sliding stop, composed of the rod $r$ and spring $s$, when these parts, constructed and operating together as explained, are used in combination with the revolving reels or tables R' R', for the purpose of controlling their action, substantially as described.

ELIHU BOSWELL.

Witnesses:
THOS. DILLON,
E. T. WOODMANSEE.